US010922455B2

(12) United States Patent
Samuel et al.

(10) Patent No.: US 10,922,455 B2
(45) Date of Patent: Feb. 16, 2021

(54) METHODS AND SYSTEMS FOR MODELING AN ADVANCED 3-DIMENSIONAL BOTTOMHOLE ASSEMBLY

(71) Applicant: Halliburton Energy Services, Inc., Houston, TX (US)

(72) Inventors: Robello Samuel, Cypress, TX (US); Cili Sun, Sugar Land, TX (US); Alp Kozak, Houston, TX (US); Alfred Fung, Stafford, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 606 days.

(21) Appl. No.: 15/531,935

(22) PCT Filed: Dec. 31, 2014

(86) PCT No.: PCT/US2014/072925
§ 371 (c)(1),
(2) Date: May 31, 2017

(87) PCT Pub. No.: WO2016/108866
PCT Pub. Date: Jul. 7, 2016

(65) Prior Publication Data
US 2017/0308634 A1  Oct. 26, 2017

(51) Int. Cl.
*G06F 30/23* (2020.01)
*E21B 44/00* (2006.01)
(Continued)

(52) U.S. Cl.
CPC ............... *G06F 30/23* (2020.01); *E21B 7/06* (2013.01); *E21B 41/0092* (2013.01);
(Continued)

(58) Field of Classification Search
CPC .. G06F 17/5018; G06F 2217/16; G06F 30/23; G06F 2111/10; E21B 44/00;
(Continued)

(56) References Cited

U.S. PATENT DOCUMENTS 4,804,051 A   2/1989  Ho
6,205,851 B1  3/2001  Jogi
(Continued)

FOREIGN PATENT DOCUMENTS

AU    758031    3/2003
CN   1401880    3/2003
(Continued)

OTHER PUBLICATIONS

Office Action for Canadian Patent Application No. 2964228 dated Feb. 13, 2018; 8 pages.
(Continued)

*Primary Examiner* — Juan C Ochoa
(74) *Attorney, Agent, or Firm* — Benjamin Ford; Baker Botts L.L.P.

(57) ABSTRACT

In accordance with some embodiments of the present disclosure, methods and systems for modeling an advanced 3-dimensional bottomhole assembly are disclosed. The method may include determining a drill string property for a drill string having a rotary steerable drill bit; determining a drilling parameter for a drilling operation; generating a finite element model of the drill string based on the drill string property and the drilling parameter; performing a vibrational analysis of the finite element model; and predicting a drill string behavior during the drilling operation based on the vibrational analysis, the drill string behavior including a directional behavior, rate of penetration, or drilling efficiency of the rotary steerable drill bit.

18 Claims, 5 Drawing Sheets

(51) Int. Cl.
  E21B 47/007       (2012.01)
  E21B 7/06         (2006.01)
  E21B 41/00        (2006.01)
  E21B 47/00        (2012.01)
  G01N 29/44        (2006.01)
  G06F 111/10       (2020.01)
  E21B 47/022       (2012.01)
  E21B 47/08        (2012.01)
  E21B 49/00        (2006.01)
  E21B 49/08        (2006.01)

(52) U.S. Cl.
  CPC .............. *E21B 44/00* (2013.01); *E21B 47/00* (2013.01); *E21B 47/007* (2020.05); *G01N 29/4472* (2013.01); *E21B 41/00* (2013.01); *E21B 47/022* (2013.01); *E21B 47/08* (2013.01); *E21B 49/00* (2013.01); *E21B 49/08* (2013.01); *G06F 2111/10* (2020.01)

(58) Field of Classification Search
  CPC .. E21B 47/0006; E21B 47/00; E21B 41/0092; E21B 7/06; E21B 49/08; E21B 49/00; E21B 47/08; E21B 47/022; E21B 47/007; G01N 29/4472; G05B 19/02
  USPC ........................................................ 703/10, 2
  See application file for complete search history.

(56) References Cited

U.S. PATENT DOCUMENTS

| | | | |
|---|---|---|---|
| 6,438,495 B1 | 8/2002 | Chau et al. | |
| 6,785,641 B1* | 8/2004 | Huang | E21B 10/00 175/45 |
| 7,027,925 B2 | 4/2006 | Terentyev et al. | |
| 7,054,750 B2 | 5/2006 | Rodney et al. | |
| 7,814,989 B2 | 10/2010 | Nikolakis-Mouchas et al. | |
| 8,214,188 B2 | 7/2012 | Bailey et al. | |
| 8,684,108 B2 | 4/2014 | Turner et al. | |
| 9,696,198 B2 | 7/2017 | Turner et al. | |
| 2006/0195307 A1 | 8/2006 | Huang et al. | |
| 2008/0255817 A1 | 10/2008 | Pabon et al. | |
| 2011/0166837 A1* | 7/2011 | Servaes | E21B 41/0092 703/2 |
| 2011/0186353 A1 | 8/2011 | Turner et al. | |
| 2013/0105221 A1 | 5/2013 | Wassell | |
| 2014/0007646 A1* | 1/2014 | Rodney | G01V 13/00 73/1.37 |
| 2014/0062716 A1* | 3/2014 | Clark | E21B 47/12 340/853.2 |
| 2014/0151121 A1* | 6/2014 | Boone | E21B 44/02 175/27 |
| 2014/0251688 A1 | 9/2014 | Turner et al. | |
| 2015/0130627 A1* | 5/2015 | Morrison | E21B 44/00 340/854.4 |

FOREIGN PATENT DOCUMENTS

| | | |
|---|---|---|
| CN | 1910589 | 2/2007 |
| CN | 102822752 | 12/2012 |
| CN | 104005750 | 8/2014 |
| RU | 2373390 | 11/2009 |
| RU | 2461707 | 11/2009 |
| RU | 2436947 | 12/2011 |
| WO | 03/089759 | 10/2003 |

OTHER PUBLICATIONS

Office Action for Russian Patent Application No. 2017118458 dated Jul. 26, 2018; 15 pages.

Brakel, Johannes Daniel, and J. J. Azar, "Prediction of wellbore trajectory considering bottomhole assembly and drill-bit dynamics," SPE Drilling Engineering 4.02 (1989): 109-118; 10 pages.

Drill String Mechanics Torque and Drag solutions, Retrieved on May 18, 2017, https://www.drillscan.com/drill-string-mechanics-torque-and-drag-solutions/, 2 pages.

Software BHA Trajectory Prediction—DrillScan Drilling Software, Retrieved on May 18, 2017, https://www.drillscan.com/bha-trajectory-prediction/, 4 pages.

Directional Drilling—DrillScan Directional Drilling Software, Retrieved on May 18, 2017 https://www.drillscan.com/directional-drilling/, 2 pages.

APS Technology Website "WellDrill", Technical Data Sheet, http://www.aps-tech.com/tds/APS-WellDrill.pdf, 2 pages, 2016.

Kruljac, Igor, Boris Kavedžija, and Ivanka Jüttner, "A Method for Modeling Directional Behaviour of Bottomhole Assemblies with Downhole Motors," 14th International Scientific-Technical Conference; New Methods and Technologies in Petroleum Geology, Drilling, and Reservoir Engineering, 2002, 13 pages.

International Search Report and Written Opinion for PCT Patent Application No. PCT/US2014/072925, dated Sep. 22, 2015, 18 pages.

International Preliminary Report on Patentability for PCT Patent Application No. PCT/US2014/072925, dated Jul. 13, 2017; 12 pages.

Office Action for Chinese Patent Application No. 201480082730.9, dated Feb. 27, 2020, no English translation.

* cited by examiner

METHODS AND SYSTEMS FOR MODELING AN ADVANCED 3-DIMENSIONAL BOTTOMHOLE ASSEMBLY

RELATED APPLICATIONS

This application is a U.S. National Stage Application of International Application No. PCT/US2014/072925 filed Dec. 31, 2014, which designates the United States, and which is incorporated herein by reference in its entirety.

TECHNICAL FIELD

The present disclosure relates generally to underground drilling operations and, more particularly, methods and systems for modeling an advanced 3-dimensional bottomhole assembly.

BACKGROUND

Natural resources, such as hydrocarbons and water, are commonly obtained from subterranean formations that may be located onshore or offshore. The development of subterranean operations and the processes involved in removing natural resources from a subterranean formation typically involve a number of different steps such as, for example, drilling a wellbore at a desired well site, treating the borehole to optimize production of the natural resources, and performing the necessary steps to produce and process the natural resources from the subterranean formation.

Various types of tools are used to form wellbores in subterranean formations. Examples of such tools include steerable rotary drill bits. A downhole drilling assembly may include a drill string, an electrically actuated clutch assembly, and a drive shaft coupled to a drill bit. These components work together to provide steering power to flex the drive shaft and thus steer the drill bit in a desired direction.

An operator at the surface may control aspects of the drilling operation by setting drilling parameters for elements of the drilling assembly. For example, the operator may set parameters that control the clutch assembly that steers the drill bit. The drilling parameters may affect the performance of the drilling operation, including, but not limited to, the directional behavior and the rate of penetration (ROP) of the drilling assembly into the formation.

BRIEF DESCRIPTION OF THE DRAWINGS

For a more complete understanding of the present disclosure and its features and advantages, reference is now made to the following description, taken in conjunction with the accompanying drawings, in which.

DETAILED DESCRIPTION

The present disclosure describes a finite element model used to perform a vibrational analysis of a drill string for use during a drilling operation. During the drilling operation, sensors located in a bottomhole assembly (BHA) at the lower end of the drill string may gather information about the drill string, the wellbore containing the drill string, and the surrounding subterranean area. A finite element model may be generated by representing the drill string and wellbore as a set of discrete beam elements connected by nodes, each of which includes a finite set of properties or parameters. The behavior of the entire system may be predicted by computing, at each point in time, the behavior of each element and node based on surrounding elements and nodes. In this way, a complex physical problem can be solved by breaking it into a number of smaller pieces, solving each piece, then combining the solutions. Accordingly, a system and method may be designed in accordance with the teachings of the present disclosure to create a finite element model of the drill string and to predict its behavior. A finite element analysis, or the results of a finite element analysis, of the model may be used to evaluate the efficiency of the drilling operation and to predict the directional performance and rate of penetration (ROP) of a drill bit, for example a rotary steerable drill bit. In some embodiments, a finite element analysis, or the results of a finite element analysis, are dynamically identified and displayed, for example, in real-time during a drilling operation. In some embodiments, techniques described herein may provide users (e.g., field engineers, operational engineers and analysts, and others) with a reliable and direct tool to visualize a drilling operation, to evaluate the efficiency of current drilling parameters, to modify or otherwise manage drilling parameters, or to perform other types of analysis or design.

Embodiments of the present disclosure and its advantages are best understood by referring to FIGS. 1 through 5, where like numbers are used to indicate like and corresponding parts.

Figure 1:
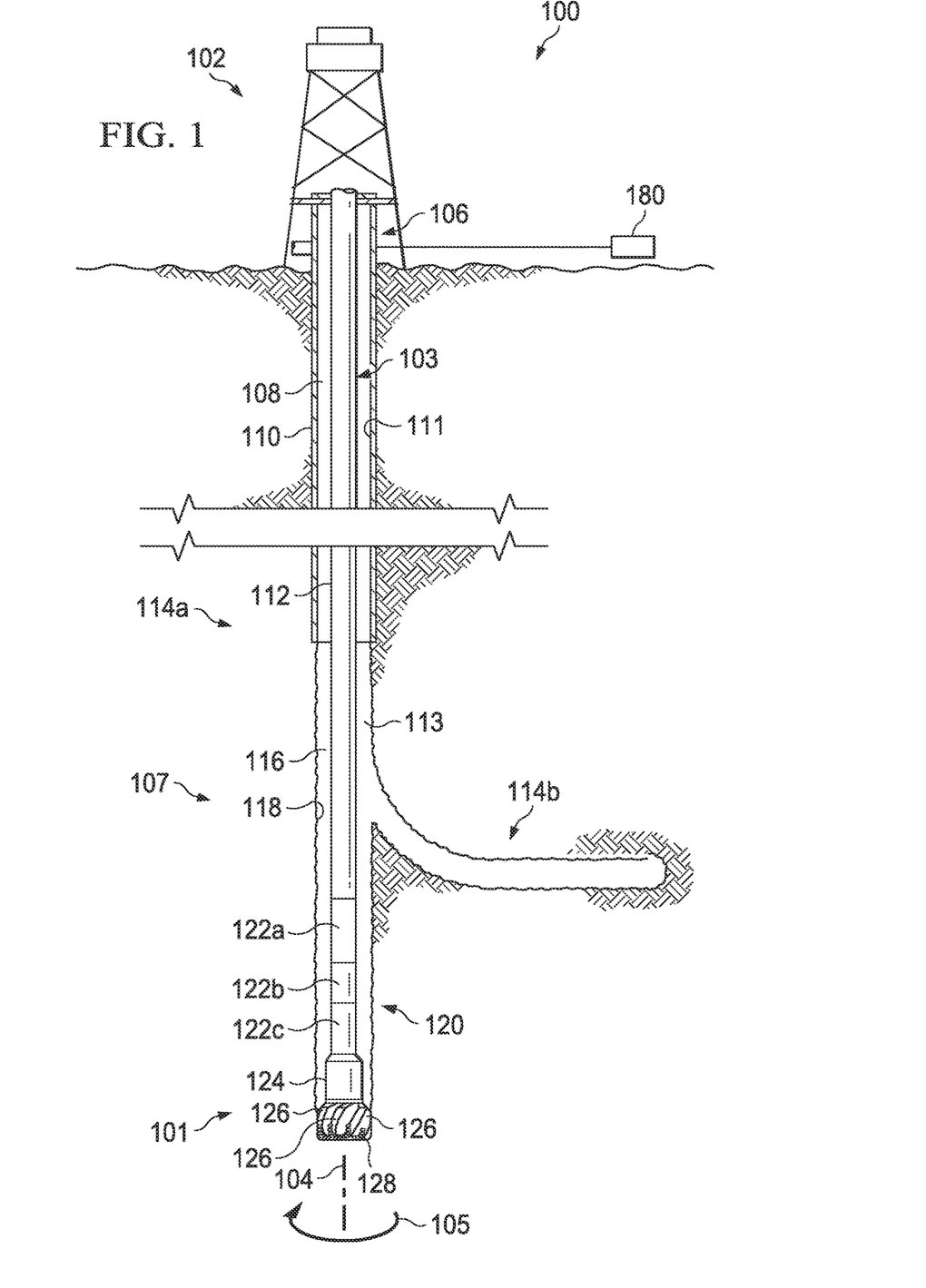
FIG. 1 illustrates an elevation view of an exemplary drilling system.

FIG. 1 illustrates an elevation view of an example embodiment of a drilling system. Drilling system 100 may include well surface or well site 106. Various types of drilling equipment such as a rotary table, drilling fluid pumps and drilling fluid tanks (not expressly shown) may be located at well surface or well site 106. For example, well site 106 may include drilling rig 102 that may have various characteristics and features associated with a "land drilling rig." However, drilling systems incorporating teachings of the present disclosure may be satisfactorily used with drilling equipment located on offshore platforms, drill ships, semi-submersibles and drilling barges (not expressly shown). Well site 106 and drilling rig 102 may sit atop subterranean region 107 located beneath the ground surface.

Drilling system 100 may also include drill string 103 associated with rotary steerable drill bit ("drill bit") 101 that may be used to form a wide variety of wellbores or bore holes such as generally vertical wellbore 114a, generally horizontal wellbore 114b, or any combination thereof. Various directional drilling techniques and associated components of bottom hole assembly (BHA) 120 of drill string 103 may be used to form horizontal wellbore 114b. For example, normal forces may be applied to BHA 120 proximate kickoff location 113 to form generally horizontal wellbore 114b extending from generally vertical wellbore 114a. The term "directional drilling" may be used to describe drilling a wellbore or portions of a wellbore that extend at a desired angle or angles relative to vertical. The desired angles may be greater than normal variations associated with vertical wellbores. Direction drilling may also be described as drilling a wellbore deviated from vertical. The term "horizontal drilling" may be used to include drilling in a direction approximately ninety degrees)(90° from vertical. "Uphole"

may be used to refer to a portion of wellbore 114 that is closer to well surface 106. "Downhole" may be used to refer to a portion of wellbore 114 that is further from well surface 106.

BHA 120 may be formed from a wide variety of components configured to form wellbore 114. For example, components 122a, 122b, and 122c of BHA 120 may include, but are not limited to, drill bits (e.g., drill bit 101), coring bits, drill collars, rotary steering tools, directional drilling tools, downhole drilling motors, reamers, hole enlargers, stabilizers, sensors, logging-while-drilling tools, or telemetry subs. The number and types of components 122 included in BHA 120 may depend on anticipated downhole drilling conditions and the type of wellbore that will be formed by drill string 103 and rotary drill bit 101.

BHA 120 may include sensors that gather measurements of various drilling parameters such as position, orientation, weight-on-bit (WOB), torque, vibration, borehole diameter, downhole temperature and pressure, or other suitable parameters. In some embodiments, components of BHA 120 may include sensors, controllers, communications equipment, or other suitable components. For example, component 122c may include magnetometers, inclinometers, accelerometers, gyroscopes, or other suitable sensors. The orientation of drill bit 101 may be specified in terms of a tool face angle (rotational orientation), an inclination angle (the slope of the tool face), and compass direction, each of which may be derived from measurements by sensors in component 122c. In some embodiments, component 122c may include a 3-axis fluxgate magnetometer and a 3-axis accelerometer.

BHA 120 may include one or more logging-while-drilling (LWD) tools for measuring parameters of subterranean region 107 while drilling wellbore 114. In some embodiments, component 122b may include LWD tools that rotate and collect measurements of resistivity, density, porosity, acoustic wave speed, radioactivity, neutron or gamma ray attenuation, magnetic resonance decay rates, or any other suitable physical parameter. Component 122b may also include a downhole controller that associates a time stamp and the current tool position and orientation with each of the measurements. Such measurements may be stored in an internal memory and processed by the downhole controller or communicated to components at well surface 106. The downhole controller may format, package, or otherwise process information associated with the measurements before communicating the measurements. In some embodiments, a downhole controller may communicate only a portion of the measurements at any given time.

BHA 120 may include a telemetry sub that maintains a communication link with components at well surface 106, receives commands from components at well surface 106 and communicates measurements from downhole tools associated with drill string 103. In some embodiments, component 122a may include a mud-pulse telemetry system that communicates with sensors in component 122c and a downhole controller and LWD tools in component 122b. However, any suitable subsurface-to-surface communication mechanism may be used.

BHA 120 may include other types of well logging instruments (not expressly shown) and other downhole tools associated with directional drilling of a wellbore. Examples of logging tools and/or directional drilling tools may include, but are not limited to, acoustic, neutron, gamma ray, density, photoelectric, nuclear magnetic resonance, rotary steering tools and/or any other commercially available well tool. Further, BHA 120 may also include a rotary drive (not expressly shown) connected to components 122a, 122b, and 122c and which rotates at least part of drill string 103 together with components 122a, 122b, and 122c.

Although this disclosure describes specific components 122a, 122b, and 122c, any suitable components of a BHA may be used. Furthermore, although this disclosure discusses a particular arrangement of components 122a, 122b, and 122c, components of BHA 120 may be arranged in any suitable positions within BHA 120.

Wellbore 114 may be defined in part by casing string 110 that may extend from well surface 106 to a selected downhole location. Portions of wellbore 114 that do not include casing string 110 may be described as "open hole." Various types of drilling fluid may be pumped from well surface 106 through drill string 103 to drill bit 101. The drilling fluids may be directed to flow from drill string 103 to respective nozzles passing through rotary drill bit 101. The drilling fluid may be circulated back to well surface 106 through annulus 108. In open hole embodiments, annulus 108 may be defined in part by outside diameter 112 of drill string 103 and inside diameter 118 of wellbore 114. In embodiments using casing string 110, annulus 108 may be defined by outside diameter 112 of drill string 103 and inside diameter 111 of casing string 110.

Drill bit 101 may include one or more blades 126 that may be disposed outwardly from exterior portions of rotary bit body 124 of drill bit 101. Blades 126 may be any suitable type of projections extending outwardly from rotary bit body 124. Drill bit 101 may rotate with respect to bit rotational axis 104 in a direction defined by directional arrow 105. Blades 126 may include one or more cutting elements 128 disposed outwardly from exterior portions of each blade 126. Blades 126 may also include one or more depth of cut controllers (not expressly shown) configured to control the depth of cut of cutting elements 128. Blades 126 may further include one or more gage pads (not expressly shown) disposed on blades 126. Drill bit 101 may have many different designs, configurations, and/or dimensions according to the particular application of drill bit 101.

Drilling system 100 may also include computing subsystem 180, in communication with sensors, LWD tools, well-logging instruments, and other downhole tools in wellbore 114. As illustrated in FIG. 1, computing subsystem 180 may be located at well surface 106. In other embodiments, computing subsystem 180 or components of computing subsystem 180 may be located within wellbore 114. Computing subsystem 180 may include one or more computing devices or systems located at well site 106. Computing subsystem 180 or any of its components may be located apart from the other components shown in FIG. 1. For example, computing subsystem 180 may be located in a data processing center, a computing facility, or another suitable location. In some cases, all or part of computing subsystem 180 may be contained in a technical command center at a well site, in a real-time operations center at a remote location, in another appropriate location, or any suitable combination of these.

Computing subsystem 180 may receive and analyze information from sensors, LWD tools, well-logging instruments, and other downhole tools in wellbore 114. Computing subsystem 180 may receive information from downhole tools and sensors at any suitable time. For example, computing subsystem 180 may receive information from downhole tools and sensors in real time or near real time during a drilling operation. Using this information, computing subsystem 180 may generate a model of drill bit 101 and drill string 103. The model may include known information about the drill string, for example the number, length, physical properties, and arrangement of the segments of drilling pipe making up drill string 103. The model may include information about BHA 120 and drill bit 101, for example the number and arrangement of roller cones or blades in the drill bit. The model may include information about the drilling operation, for example the rotary speed of the drill string at well surface 106 or geological properties of subterranean region 107. The model may include real-time or near-real time information gathered from sensors in BHA 120 or other suitable sensors included in drilling system 100.

In operation, computing subsystem 180 may use the model to perform a finite element analysis of drill string 103 and drill bit 101 as they are used in the drilling operation. For example, this analysis may be used to predict vibrational modes of the drill string and their effect on the directional behavior and rate of penetration (ROP) of drill bit 101 during drilling operations. Computing subsystem 180 may further calculate improved drilling parameters based on the model of drill bit 101 and drill string 103 and communicate the improved drilling parameters to a downhole controller associated with drill string 103 in order to improve the efficient of drilling operations. Additionally, in some embodiments, computing subsystem 180 may present sensor and tool information to users via a display. In some embodiments, computing subsystem 180 may present predictions of the directional behavior of drill bit 101 to users to allow operators and engineers to make adjustments in drilling parameters or other aspects of the drilling operation based on the information.

Drilling system 100 and computing subsystem 180 may include or access any suitable communications infrastructure. For example, drilling system 100 may include multiple separate communication links or a network of interconnected communication links. These communication links may include wired or wireless communications systems. For example, components of computing subsystem 180 may communicate with one another through wired or wireless links or networks. These communication links may include a public data network, a private data network, satellite links, dedicated communication channels, telecommunication links, or any suitable combination of these and other communication links.

Drilling system 100 may include additional or different features, and the features of drilling system 100 may be arranged as shown in FIG. 1, or in another suitable configuration. Some of the techniques and operations described here may be implemented by a computing subsystem configured to provide the functionality described. In various embodiments, a computing system may include any of various types of devices, including, but not limited to, personal computer systems, desktop computers, laptops, notebooks, mainframe computer systems, handheld computers, workstations, tablets, application servers, storage devices, computing clusters, or any type of computing or electronic device.

Figure 2:
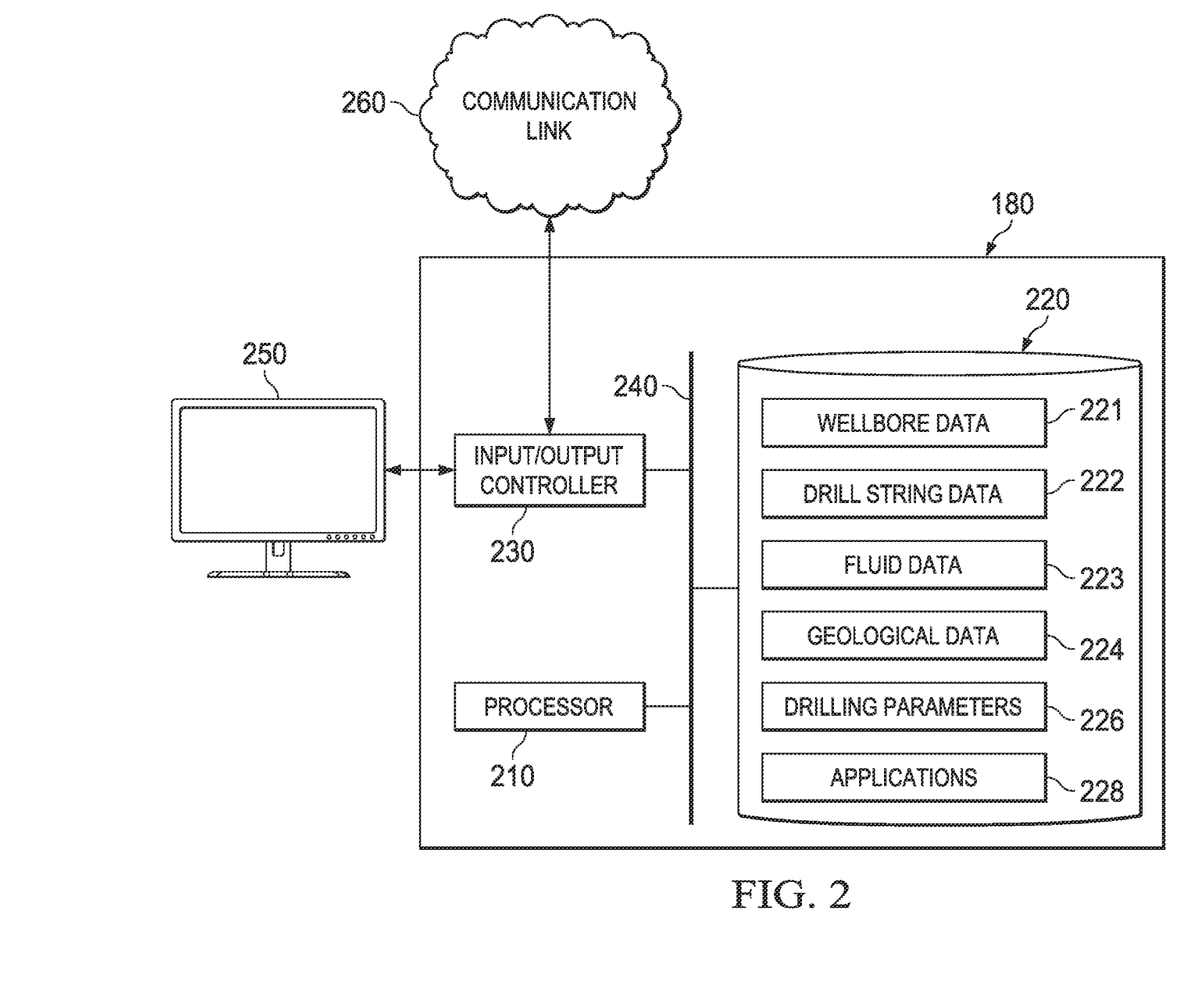
FIG. 2 illustrates an exemplary computing subsystem.

FIG. 2 illustrates an exemplary computing subsystem. Computing subsystem 180 may be located at or near one or more wellbores of drilling system 100 or at a remote location. All or part of computing subsystem 180 may operate as a component of or independent of drilling system 100 or independent of any other components shown in FIG. 1. Computing subsystem 180 may include memory 220, processor 210, and input/output controller 230 communicatively coupled by bus 240.

Processor 210 may include hardware for executing instructions, such as those making up a computer program, such as applications 228. As an example and not by way of limitation, to execute instructions, processor 210 may retrieve (or fetch) the instructions from an internal register, an internal cache, memory 220; decode and execute them; and then write one or more results to an internal register, an internal cache, or memory 220. In some embodiments, processor 210 may execute instructions, for example, to generate output data based on data inputs. For example, processor 210 may run applications 228 by executing or interpreting software, scripts, programs, functions, executables, or other modules contained in applications 228. Processor 210 may perform one or more operations related to FIGS. 2-5. Input data received by processor 210 or output data generated by processor 210 may include wellbore data 221, drill string data 222, fluid data 223, geological data 224, drilling parameters 226, or other suitable data.

Memory 220 may include, for example, random access memory (RAM), a storage device (e.g., a writable read-only memory (ROM) or others), a hard disk, a solid state storage device, or another type of storage medium. Computing subsystem 180 may be preprogrammed or it may be programmed (and reprogrammed) by loading a program from another source (e.g., from a CD-ROM, from another computer device through a data network, or in another manner). In some embodiments, input/output controller 230 may be coupled to input/output devices (e.g., monitor 250, a mouse, a keyboard, or other input/output devices) and to communication link 260. The input/output devices may receive and transmit data in analog or digital form over communication link 260.

Memory 220 may store instructions (e.g., computer code) associated with an operating system, computer applications, and other resources. Memory 220 may also store application data and data objects that may be interpreted by one or more applications or virtual machines running on computing subsystem 180. Memory 220 may include wellbore data 221, drill string data 222, fluid data 223, geological data 223, drilling parameters 226, and applications 228. In some implementations, a memory of a computing device may include additional or different data, applications, models, or other information.

Wellbore data 221 may include information about the size and orientation of the wellbore. For example, referring to FIG. 1, wellbore data 221 may include the inclination, azimuth, diameter, and depth of generally vertical wellbore 114a, generally horizontal wellbore 114b, or any combination thereof.

Drill string data 222 may include information about the properties of the drill string present in the wellbore. For example, referring to FIG. 1, drill string data 222 may include the number of segments of drill pipe in drill string 103; the length of each segment; the outer and inner diameter of each segment; the weight and length of each segment; material properties of each segment such as its polar moment of inertia, its shear modulus, and other suitable properties; the location of drill string devices such as stabilizers; the location of known contact points between the drill string and the wellbore; and other properties of the drill string. In some embodiments, drill string data 222 may include information about the types of sensors, LWD tools, and other downhole tools included in BHA 120 and/or information about drill bit 101. For example, drill string data 222 may include the diameter of drill bit 101, the number of roller cones or cutters in drill bit 101, the number of hours in service for drill bit 101, and other properties of drill bit 101.

Fluid data 223 may include information about fluids present in the wellbore. For example, referring to FIG. 1, fluid data 223 may include the density and viscosity parameters of drilling fluid present in wellbore 114.

Geological data 224 may include information about geological properties of subterranean region 107. For example, referring to FIG. 1, geological data 224 may include information on lithology, fluid content, stress profile, pressure profile, spatial extent, thickness, anisotropy, or other attributes of one or more rock formations in subterranean region 107. In some embodiments, geological data 224 may include information collected from well logs, rock samples, outcroppings, seismic surveys, microseismic imaging, or other data sources.

Drilling parameters 226 may include information about the mechanisms used to steer a rotary steerable drill bit. For example, referring to FIG. 1, drilling parameters 226 may include information about an eccentering mechanism included in drill bit 101, the range of eccentricity settings allowed for the eccentering mechanism, the weight on bit (WOB), the speed of rotation of drill string 103, flow rate, survey interval, and other suitable parameters. In some embodiments, drilling parameters 226 may include information about the current orientation and facing of drill bit 101 and/or information about the desired inclination, azimuth, and diameter of wellbore segments to be drilled in the future.

Applications 228 may include software applications, scripts, programs, functions, executables, or other modules that may be interpreted or executed by processor 210. The applications 228 may include machine-readable instructions for performing one or more operations related to FIGS. 2-5. For example, referring to FIG. 1, applications 228 may include machine-readable instructions for generating a model of drill bit 101 and drill string 103 to predict the directional behavior and rate of penetration (ROP) of drill bit 101 during a drilling operation. Applications 228 may also include machine-readable instructions for incorporating measurements from sensors and other downhole tools relayed from BHA 120 in the model and/or calculating improved drilling parameters. Applications 228 may receive or obtain input data, such as wellbore data 221, drill string data 222, fluid data 223, geological data 224, drilling parameters 226, or other types of input data, from memory 220, from another local source, or from one or more remote sources (e.g., via communication link 260). Applications 228 may generate output data and store output data in memory 220, in another local medium, or in one or more remote devices (e.g., by sending output data via communication link 260).

Communication link 260 may include any type of communication channel, connector, data communication network, or other link. For example, communication link 260 may include a wireless or a wired network, a Local Area Network (LAN), a Wide Area Network (WAN), a private network, a public network (such as the Internet), a WiFi network, a network that includes a satellite link, a serial link, a wireless link (e.g., infrared, radio frequency, or others), a parallel link, or another type of data communication network. In some embodiments, communications link 260 may include multiple communications links. For example, communications link 260 may include both a wired network, a satellite network, and a mud-pulse telemetry network.

Figure 3:
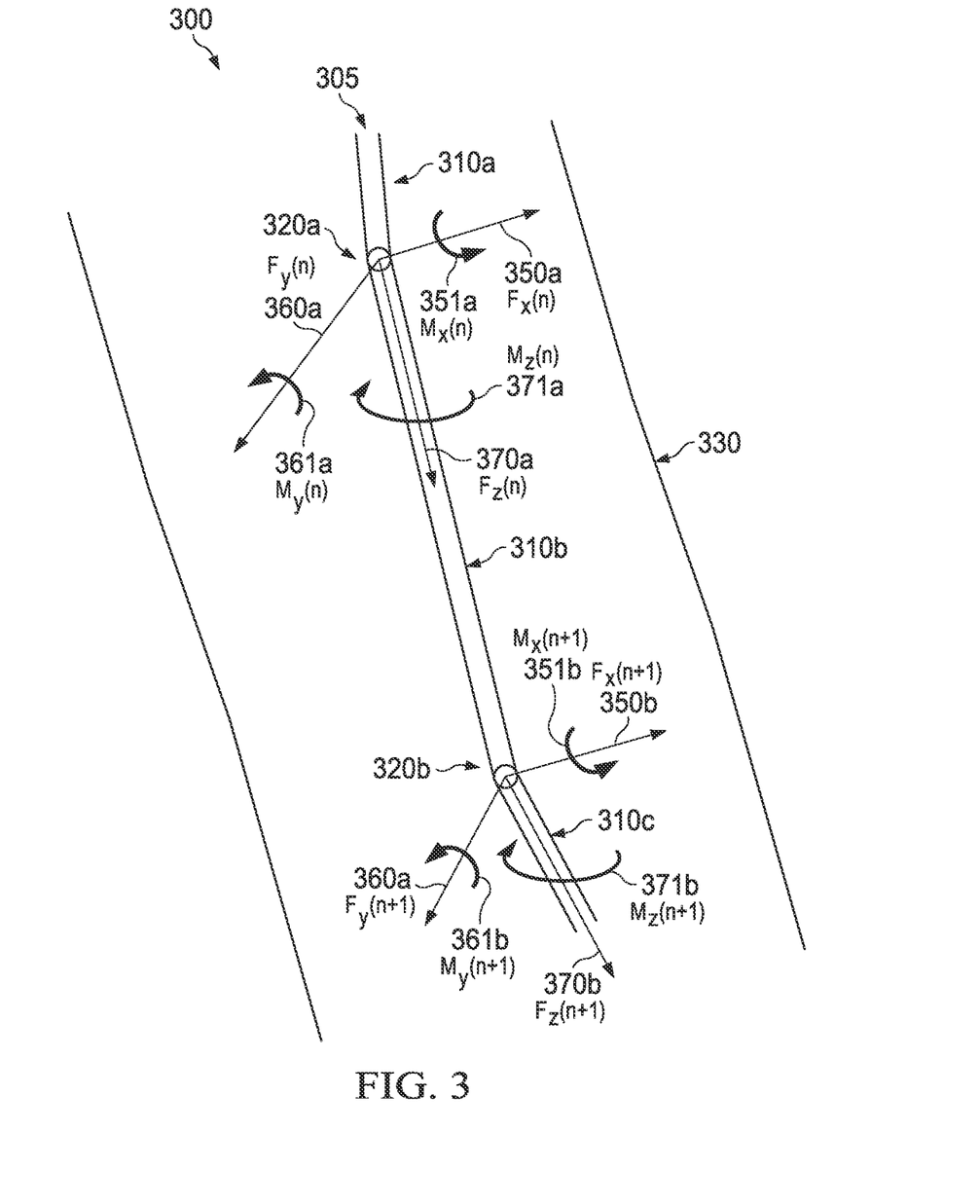
FIG. 3 illustrates an elevation view of segments of an example drill string and forces operating on the drill string.

FIG. 3 illustrates an elevation view of segments of an example drill string and forces operating on the drill string. For example, referring to FIG. 1, drill string 305 may be drill string 103 or a portion of drill string 103. Drill string 305 may include drill pipe segments 310a-c. Each of drill pipe segments 310a-c may be a single section of drill pipe. Pipe fitting 320a may connect drill pipe segments 310a and 310b. Pipe fitting 320b may connect drill pipe segments 310b and 310c. Drill string 305 may be situated within wellbore 330. For example, referring to FIG. 1, drill string 305 may be situated within wellbore 114.

During drilling operations, drill string 305 may experience a variety of forces or vibrations. To accurately describe each of the forces or vibrations, each pipe fitting 320 may be referred to by an index. For example, pipe fitting 320a may be referred to by index n, and pipe fitting 320b may be referred to by index n+1. Forces or vibrations experienced by drill string 305 at a particular location may similarly be referred to by index n to indicate the location at which they are experienced. Although this disclosure illustrates an index n that begins with n=0 at the surface and increases with depth, an index that decreases with depth or any other suitable index may be used. The forces or vibrations may also be described in terms of three orthogonal axes. In some embodiments, the z-axis may lie along the axis of drill string 305 and increase with depth, while the x- and y-axes are perpendicular to the z-axis and to one another. However, any suitable system of axes may be used to describe the forces and vibrations.

In some embodiments, at approximately the location of pipe fitting 320a, drill string 305 may experience normal force 350a along the x-axis, referred to as $F_x(n)$, and torsional force 351a about the x-axis, referred to as $M_x(n)$. At approximately the same location, drill string 305 may further experience normal force 360a along the y-axis, referred to as $F_y(n)$, and torsional force 361a about the y-axis, referred to as $M_y(n)$. At approximately the same location, drill string 305 may further experience axial force 370a along the z-axis, referred to as $F_x(n)$, and torsional force 371a about the z-axis, referred to as $M_z(n)$. Similarly, at approximately the location of pipe fitting 320b, drill string 305 may experience forces 350b, 351b, 360b, 361b, 370b, and 371b, referred to as $F_x(+1)$, $M_x(n+1)$, $F_y(n+1)$, $M_y(n+1)$, $F_z(n+1)$, and $M_z(n+1)$ respectively. Forces 350-371 may be constant, varying, or periodic (e.g., vibrations). Forces 350-371 acting at one node, for example pipe fitting 320a, may be transmitted or partially transmitted to an adjacent or nearby portion of drill string 305. For example, drill pipe segment 310b may transmit a portion of torsional force 361a from pipe fitting 320a to pipe fitting 320b. As a result, the forces acting at any portion of drill string 305 may directly or indirectly affect the forces operating at the end of the drill string, for example at drill bit 101.

Figure 4:
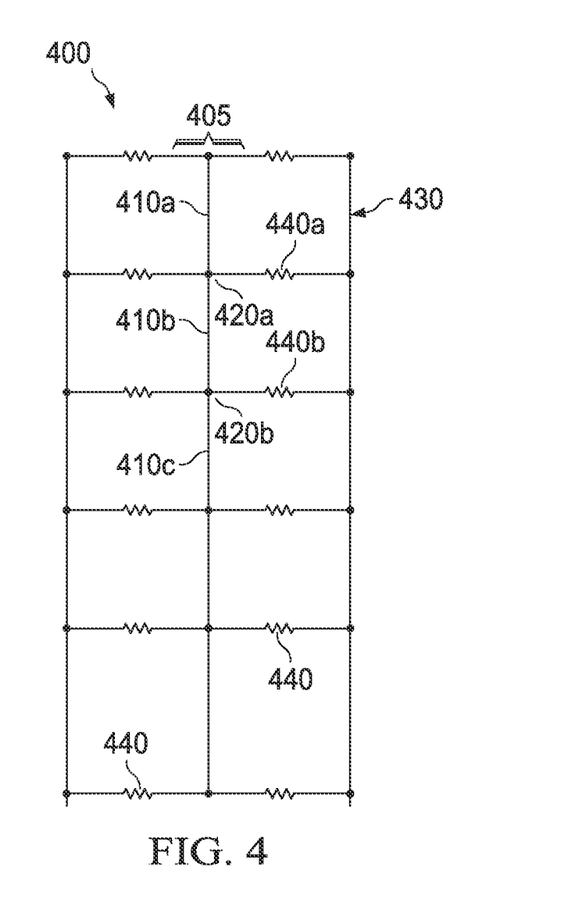
FIG. 4 illustrates a partial view of a finite element model of an example drill string.

FIG. 4 illustrates a partial view of a finite element model of an example drill string, in accordance with some embodiments of the present disclosure. Finite element model 400 may include beam string 405 including beam elements 410 arranged in a linear string. In some embodiments, each beam element 410 may represent a drill pipe segment. For example, referring to FIG. 3, beam element 410a may represent drill pipe segment 310a, beam element 410b may represent drill pipe segment 310b, and beam element 410c may represent drill pipe segment 310c. Model 400 may include parameters representing various properties of each beam element. For example, parameters for each beam element 410 may include compression, torsion, and bending properties.

Finite element model 400 may further include nodes 420 connecting beam elements 410. For example, node 420a may connect beam element 410a and beam element 410b. In some embodiments, each node 420 may represent a pipe fitting connecting two drill pipe segments. For example, referring to FIG. 3, node 420a may represent pipe fitting 320a and node 420b may represent pipe fitting 420b. In some embodiments, nodes 420 may have six or more degrees of freedom, including translations along, and rotations about, each of the x-, y-, and z-axes. Finite element model 400 may further include parameters representing the forces at each node 420. For example, referring to FIG. 3, parameters for node 420a may include representations of $F_x(n)$, $M_x(n)$, $F_y(n)$, $M_y(n)$, $F_z(n)$, and $M_z(n)$.

Finite element model 400 may also include bore element 430. In some embodiments, bore element 430 may represent the wellbore containing the drill string. For example, referring to FIG. 3, bore element 430 may represent wellbore 330.

Finite element model 400 may further include contact elements 440 that connect beam elements 410 and bore element 430. Contact elements 440 may represent the gap between a drill string and the wellbore. For example, referring to FIG. 3, contact elements 440 may represent the gap between drill string 305 and wellbore 330. In some embodiments, contact elements 440 may represent one or more forces acting on the beam elements 410. For example, referring to FIG. 3, contact element 440a may represent a compression force on node 320a parallel to $F_x(n)$. In some embodiments, contact elements 440 may further represent friction forces tangential to the beam elements 410. For example, contact element 440a may further represent frictional forces on node 320a parallel to $F_y(n)$ and $F_z(n)$. In some embodiments, contact elements 440 may further include a coefficient of sliding friction. For example, referring to FIG. 1, contact elements 440 may include a coefficient of sliding friction that depends on the physical characteristics of the drilling fluid present in wellbore 114 and whether wellbore 114 is an open hole or instead includes a casing string 110 at the location corresponding to the contact element.

In some embodiments, finite element model 400 is a two-dimensional model. For example, finite element model 400 may include two contact elements 440 located on opposite sides of each node 420. In other embodiments, finite element model 400 is a three-dimensional model. For example, finite element model 400 may include four contact elements 440 for each node 420, arranged in opposing pairs, with each pair situated orthogonally to the other pair.

In some embodiments, finite element model 400 may be used to perform a finite element analysis of a drill string. For example, the drag on each beam section 410 may be calculated based on the normal forces $F_x(n)$ and $F_y(n)$ and the coefficient of friction at node n. In some embodiments, the drag at node n may be calculated as the incremental moment $\Delta M(n)$ needed to overcome the friction forces at node n, according to the following equations:

$$\Delta F_n(n) = [(F_t(n)\Delta\alpha(n)\sin\theta_A(n))^2 + (\Delta F_t(n)\theta(n) + W\sin\theta_A(n))^2)]^{\frac{1}{2}} \quad (1)$$

$$\Delta F_t(n) = W\cos\theta_A \pm \mu F_n(n) \quad (2)$$

$$\Delta M(n) = \mu(n)F_n(n)r \quad (3)$$

where
 $F_n(n)$=the net normal force acting on beam element n;
 $F_t(n)$=the axial tension acting at the lower end of beam element n;
 $\Delta F_t(n)$=the increase in tension over the length of beam element n;

$\Delta M(n)$=the increase in torsion over the length of beam element n (i.e., the drag from the friction force);
 r=the radius of the beam element n;
 W=the weight of beam element n as buoyed by any drilling fluids;
 $\Delta\alpha(n)$=the increase in azimuth angle over the length of beam element n;
 $\Delta\theta(n)$=the increase in inclination angle over the length of beam element n;
 $\Delta\theta_A(n)$=the average inclination angle of beam element n; and
 $\mu(n)$=the sliding coefficient of friction between beam element n and bore element 430.

The total drag over the entire drill string may be calculated by summing the drag at each beam section.

The torsion of each beam section also may be calculated. In some embodiments, the calculation may begin with a torque $T_0$ applied to the first beam element. For example, referring to FIG. 1, torque $T_0$ may represent the torque applied by a rotary system at well site 106. The torsion for the first beam section may be calculated based on torque $T_0$ and the drag at node 1. The torque T (n) at other nodes may then be calculated according to the following equation:

$$T(n) = \frac{\theta(n)J(n)G(n)}{L(n)} \quad (4)$$

where
 $\theta(n)$=the angular displacement of beam element n;
 J(n)=the polar moment of inertia of beam element n;
 G(n)=the shear modulus of beam element n; and
 L(n)=the length of beam element n.

In some instances, the drag force at some node n may exceed the torque T (n) at that node. In such a case, the model predicts that beam element n will "stick" against the bore element. If the torque T (n) later exceeds the drag at that node, the beam element may free itself. This is known as a "slip." By computing the torques and drags at each node in the model, the model may predict the occurrence of stick-slip events. In addition, by computing the torque at the final beam element at the bottom of the drill string, the model may be used to calculate the torque at the BHA (and thus the torque at the drill bit). By comparing this torque to the drag forces on the drill bit, the rotation frequency of the BHA and the drill bit may also be computed. In some embodiments, the calculated torque and rotation frequency at the BHA may be compared to the actual torque and rotation frequency reported by sensors at the BHA, allowing the model to be tuned to match actual performance.

In some embodiments, the finite element analysis may further include a static analysis of the position of each beam element 410 within bore element 430. For example, the finite element analysis may include computing lateral displacement of each node along the x- and y-axes, axial displacement along the z-axis, and the distance between each node and bore element 430.

In some embodiments, the finite element analysis may further include analysis of vibrational modes of beam string 405. In some embodiments, a vibrational analysis may include one or more excitation factors to represent forces acting on the drill bit as a result of its contact with the end or sides of the wellbore. The excitation factors may be based on the properties of the drill bit and drill string and the current drilling parameters. For example, the cutting surfaces of a drill bit make periodic contact with the end of the wellbore as the drill string, and thus the drill bit, rotate. To represent the force exerted on the drill bit by the end of the wellbore, the excitation factors may include a sinusoidal axial excitation of the lowest node, with a frequency approximately equal to the rotation frequency of the drill bit multiplied by the number of roller cones or blades in the drill bit. Similarly, the drill string may experience lateral forces as a result of contact between a stabilizer vane or blade and the side of the wellbore. To represent these forces, the excitation factors may include a sinusoidal lateral excitation of the lowest node, with a frequency approximately equal to the rotation frequency of the drill bit multiplied by the number of vanes or blades on the drill bit. In some embodiments, the amplitude of these excitation factors may be equal to the WOB. In some embodiments, stick-slip events predicted by the model may result in additional excitation factors. While specific excitation factors are described in this disclosure, any suitable excitation factors may be used. The effects of these excitation factors may propagate through the model according to the equations described above, and the amplitude and frequency of vibration at each node 410 may be calculated.

In some embodiments, the vibrational analysis includes a harmonic analysis of nodes 410 in beam string 405. For example, one or more excitation factors may result in vibration at a natural frequency of some portion of beam string 405, causing large lateral displacements of one or more nodes 410. During a drilling operation, such vibrations may result in a loss of drilling efficiency or a change in the ROP and directional behavior of the drill bit. For example, referring to FIG. 1, lateral vibration at BHA 120 may alter the side-cutting angle of drill bit 101, causing a change in the directional behavior of drill bit 101. Axial vibration at BHA 120 may reduce or increase the effective WOB of drill bit 101, causing a change the ROP of drill bit 101. Stick-slip events along drill string 103 may result in additional vibrations or a loss of torque at drill bit 101, causing a change in the efficiency of the drilling operation. In this manner, the finite element analysis may be used to predict drilling direction, ROP, and efficiency based on the actual drilling parameters in use.

In some embodiments, the finite element analysis may be repeated as the drill string advances by a predetermined interval. For example, referring to FIG. 1, the finite element analysis may be repeated for every five to ten feet BHA 120 penetrates into subterranean region 107. Although this disclosure discussed a particular range of predetermined intervals, any suitable predetermined interval may be used. In some embodiments, the finite element analysis may be repeated when other input parameters change. For example, the finite element analysis may be repeated when BHA 120 enters a new subterranean area with different properties, when the WOB or rotation speed of the drill string is altered, or in response to other appropriate changes in the drilling operation. In some embodiments, the finite element analysis may be repeated at predetermined time intervals. For example, the finite element analysis may be repeated every ten seconds.

In some embodiments, a finite element analysis may be performed to predict drilling direction, ROP, and efficiency based on updated drilling parameters. For example, an operator may test the effect of altering the WOB or rotation speed of the drill string. In some embodiments, an iterative algorithm may be used to seek drilling parameters that maximize ROP or drilling efficiency, or that result in adherence to a desired directional behavior of the drill bit.

Figure 5:
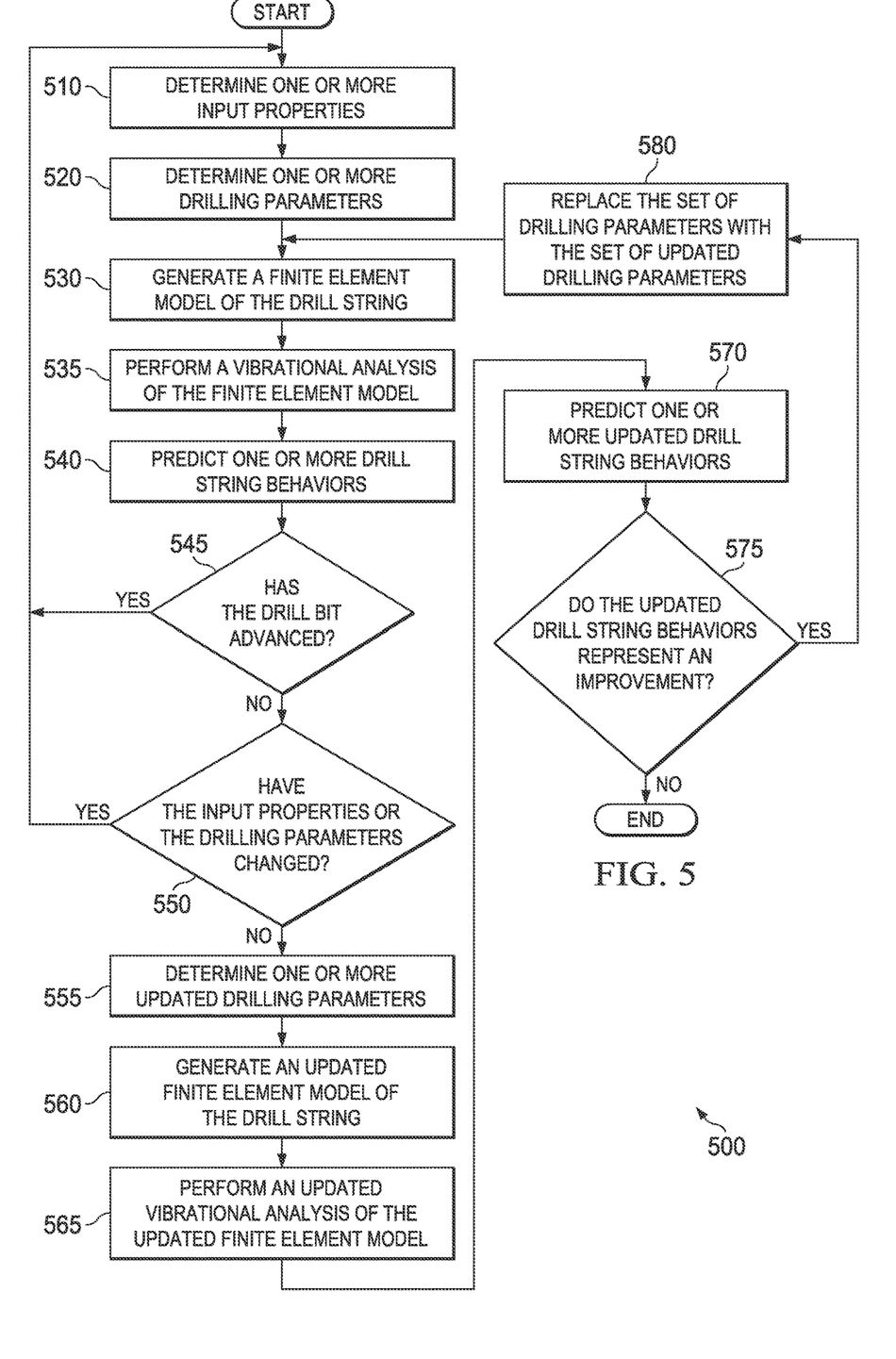
FIG. 5 illustrates a flow chart of an exemplary method for modeling an advanced 3-dimensional bottomhole assembly.

FIG. 5 illustrates a flow chart of an exemplary method for modeling an advanced 3-dimensional bottomhole assembly, in accordance with some embodiments of the present disclosure. All or part of the example method 500 may be computer-implemented, for example, using the features and attributes of the example computing subsystem 180 shown in FIGS. 1-2 or other computing systems. Method 500, individual operations of method 500, or groups of operations of method 500 may be iterated or performed simultaneously to achieve a desired result. In some cases, method 500 may include the same, additional, fewer, or different operations performed in the same or a different order. Method 500 may be performed on site near a wellbore, at a remote location, or in another location. In some embodiments, method 500, individual operations of method 500, or groups of operations of method 500 may be performed within or at the bottom of the wellbore. For example, method 500, individual operations of method 500, or groups of operations of method 500 may be performed by a downhole controller located in BHA 120.

At step 510, one or more input properties may be determined. In some embodiments, the set of input properties may include drill string properties based on a drill string used in a drilling operation. For example, referring to FIGS. 1-2, drill string data 222 may be entered by an operator or loaded from an automatic system based on the properties of drill string 103. In some embodiments, the drill string may include a rotary steerable drill bit. For examine, drill string 103 may include BHA 120, which includes rotary steerable drill bit 101. The set of input properties may include a set of wellbore properties based on a wellbore used in a drilling operation. For example, referring to FIGS. 1-2, wellbore data 221 may be entered by an operator or loaded from an automatic system based on the properties of wellbore 114. The set of input properties may include a set of fluid properties based on a fluid used in a drilling operation. For example, referring to FIGS. 1-2, fluid data 223 may be entered by an operator or loaded from an automatic system based on the properties of fluids present in wellbore 114. The set of input properties may include a set of geological properties based on one or more subterranean regions penetrated by a drilling operation. For example, referring to FIGS. 1-2, geological data 224 may be entered by an operator or loaded from an automatic system based on the properties of subterranean region 107.

At step 520, one or more drilling parameters may be determined. For example, referring to FIG. 2, drilling parameters 226 may be entered by an operator or loaded from an automatic system based on the current parameters of the drilling operation at drill site 101.

At step 530, a finite element model of the drill string may be generated. The finite element model may be used to represent the components of the drill string and evaluate its behavior during the drilling operation. In some embodiments, the finite element model may be based on the set of drill string properties, the set of wellbore properties, the set of fluid properties, the set of geological properties, and/or the set of drilling parameters. For example, referring to FIGS. 2 and 4, finite element model 400 may be generated based on drill string properties 221, wellbore properties 222, and drilling parameters 226. In some embodiments, the finite element model may include a two-dimensional model. In some embodiments, the finite element model may include a three-dimensional model.

At step 535, a vibrational analysis of the finite element model may be performed. For example, as discussed above in connection with FIG. 4, the drag, torsion, and torque at each node in beam string 405 may be computed. In some embodiments, a set of excitation factors representing forces acting on the drill bit may be computed based on the properties of the drill bit and drill string and the current drilling parameters. For example, as discussed above in connection with FIG. 4, the set of excitation factors may include lateral and axial excitations based on the properties of the drill bit. In some embodiments, the vibrational analysis may include a harmonic analysis of the finite element model. In some embodiments, a static analysis of the position of each beam element may be further performed. In some embodiments, the vibrational analysis may be performed in real time or near real time.

At step 540, one or more drill string behaviors may be predicted based on the finite element model and the vibrational analysis. In some embodiments, the set of drill string behaviors may include a directional behavior, a rate of penetration, or a drilling efficiency of the rotary steerable drill bit. In some embodiments, the prediction of a set of drill string behaviors may be performed in real time or near real time. In some embodiments, the set of drill string behaviors may further be displayed to an operator, who may use the information to monitor the drilling operation or check compliance with the drilling plan (e.g., by comparing the predicted directional behavior and ROP of the drill bit with the desired directional behavior and ROP).

At step 545, an advancement of the drill bit may be detected. In some embodiments, an advancement may be detected when the drill bit advances in the drilling direction by at least a predetermined interval. For example, as discussed above in connection with FIG. 4 with reference to FIG. 1, it may be detected that BHA 120 and drill bit 101 have penetrated five to ten feet, or any other suitable distance, into subterranean region 107 since steps 530-540 were performed. In response to detecting an advancement of the drill bit, method 500 may return to step 505. Otherwise, method 500 may continue to step 550.

At step 550, a change in the input properties or drilling parameters may be detected. For example, a change may be detected when a new section of drill string is added, or when an operator alters the desired directional behavior of the drill bit. In response to detecting a change, method 500 may return to step 505. Otherwise, method 500 may continue to step 555.

At step 555, one or more updated drilling parameters may be determined. For example, in some embodiments, an operator may select a set of updated drilling parameters to compare with the existing drilling parameters. In some embodiments, an a set of updated drilling parameters may be selected as part of an iterative search algorithm.

At step 560, an updated finite element model of the drill string may be generated. For example, an updated finite element model similar to finite element model 400 may be generated based on drill string properties 221, wellbore properties 222, and the updated drilling parameters.

At step 565, an updated vibrational analysis of the updated finite element model may be performed. In some embodiments, the updated vibrational analysis is performed on the updated finite element model in the same manner as the vibrational analysis is performed on the finite element model in step 535.

At step 570, one or more updated drill string behaviors may be predicted based on the updated vibrational analysis. In some embodiments, the updated drill string behaviors are predicted based on the updated vibrational analysis in the same manner as the drill string behaviors are predicted based on the vibrational analysis in step 540.

At step 575, process 500 may determine whether the updated drill string behaviors predicted in step 570 represent an improvement over the drill string behaviors predicted in step 540. For example, an improvement may occur if the predicted directional behavior of the drill bit corresponding to the updated drilling parameters determined in step 555 is closer to the desired directional behavior than the predicted directional behavior of the drill bit corresponding to the drilling parameters determined in step 530. In response to detecting an improvement, method 500 may proceed to step 580. Otherwise, method 500 may terminate.

At step 580, the set of drilling parameters may be replaced with the set of updated drilling parameters. Method 500 may then return to step 525.

In some embodiments, some or all of the steps in the example methods (e.g., method 500) are executed in real time during a drilling operation. A step may be performed in real time, for example, by performing the step in response to receiving data (e.g., from a sensor or monitoring system) without substantial delay. A step may be performed in real time, for example, by performing the step while monitoring for additional data from a downhole controller or telemetry sub. Some real time steps may receive an input and produce an output during a drilling operation; in some instances, the output is made available to a user within a time frame that allows the user to respond to the output, for example, by modifying the drilling operation.

In some embodiments, some or all of the steps in the example methods (e.g., method 500) are executed dynamically during a drilling operation. A step may be executed dynamically, for example, by iteratively or repeatedly performing the step based on additional inputs, for example, as the inputs are made available. In some instances, dynamic steps are performed in response to receiving data from a downhole controller or telemetry sub.

Embodiments disclosed herein include:

A. A method that includes (a) determining a drill string property for a drill string having a rotary steerable drill bit; (b) determining a drilling parameter for a drilling operation; (c) generating a finite element model of the drill string based on the drill string property and the drilling parameter; (d) performing a vibrational analysis of the finite element model; and (e) predicting a drill string behavior during the drilling operation based on the vibrational analysis, the drill string behavior including a directional behavior, rate of penetration, or drilling efficiency of the rotary steerable drill bit.

B. A system that includes a processor; a memory in communication with the processor; and instructions stored on the memory, the instructions, when executed by the processor, causing the processor to (a) determine a drill string property for a drill string having a rotary steerable drill bit; (b) determine a drilling parameter for a drilling operation; (c) generate a finite element model of the drill string based on the drill string property and the drilling parameter; (d) perform a vibrational analysis of the finite element model; and (e) predict a drill string behavior during the drilling operation based on the vibrational analysis, the drill string behavior comprising a directional behavior, rate of penetration, or drilling efficiency of the rotary steerable drill bit.

C. An article of manufacture comprising a non-volatile computer readable medium storing instructions that, when executed by a processor, cause the processor to (a) determine a drill string property for a drill string having a rotary steerable drill bit; (b) determine a drilling parameter for a drilling operation; (c) generate a finite element model of the drill string based on the drill string property and the drilling parameter; (d) perform a vibrational analysis of the finite element model; and (e) predict a drill string behavior during the drilling operation based on the vibrational analysis, the drill string behavior comprising a directional behavior, rate of penetration, or drilling efficiency of the rotary steerable drill bit.

Each of embodiments A, B, and C may have one or more of the following additional elements in any combination. Element 1: wherein performing the vibrational analysis comprises calculating an effect of an excitation factor based on the rotary steerable drill bit. Element 2: wherein the finite element model comprises a three-dimensional model. Element 3: further comprising determining an updated drilling parameter for the drilling operation; generating an updated finite element model of the drill string based on the drill string property and the updated drilling parameter; performing an updated vibrational analysis of the updated finite element model; predicting an updated drill string behavior based on the updated vibrational analysis; and determining whether the updated drill string behavior represents an improvement over the drill string behavior. Element 4: further comprising detecting whether the rotary steerable drill bit has advanced in the drilling direction by at least a predetermined length; and repeating steps (c)-(e) in response to detecting that the drill bit has advanced by at least a predetermined length. Element 5: further comprising detecting a change in the drill string property or the drilling parameter; and repeating steps (c)-(e) in response to detecting the change in the drill string property or the drilling parameter. Element 6: wherein steps (d)-(e) are performed in real time or near real time.

While this specification contains many details, these should not be construed as limitations on the scope of what may be claimed, but rather as descriptions of features specific to particular examples. Certain features that are described in this specification in the context of separate implementations may also be combined. Conversely, various features that are described in the context of a single implementation may also be implemented in multiple implementations separately or in any suitable subcombination.

A number of examples have been described. Nevertheless, it will be understood that various changes and modifications may be suggested to one skilled in the art. Accordingly, it is intended that the present disclosure encompasses such changes and modifications as fall within the scope of the appended claims.

What is claimed is:

1. A method comprising:
    (a) determining a drill string property for a drill string having a rotary steerable drill bit;
    (b) determining a drilling parameter for a drilling operation;
    (c) generating a finite element model of the drill string based on the drill string property and the drilling parameter, the finite element model comprising:
        a three-dimensional model;
        a plurality of nodes representing the drill string;
        a plurality of contact elements for each node of the plurality of nodes, the contact elements arranged in opposing pairs with a first pair situated orthogonally to a second pair;
    (d) performing a vibrational analysis of the finite element model;
    (e) predicting a drill string behavior during the drilling operation based on the vibrational analysis, the drill string behavior including a directional behavior, a rate of penetration, or a drilling efficiency of the rotary steerable drill bit;
    detecting, during the drilling operation, whether the rotary steerable drill bit has advanced in the drilling direction by at least a predetermined length that provides an interval to iterate at least some of steps (c)-(e); and
    repeating steps (c)-(e) in response to detecting that the rotary steerable drill bit has advanced by at least the predetermined length.

2. The method of claim 1, wherein performing the vibrational analysis comprises calculating an effect of an excitation factor based on the rotary steerable drill bit.

3. The method of claim 2, wherein:
    calculating the effect of the excitation factor comprises applying sinusoidal axial and lateral excitations of a lowest node of the plurality of nodes.

4. The method of claim 1, further comprising:
    determining an updated drilling parameter for the drilling operation;
    generating an updated finite element model of the drill string based on the drill string property and the updated drilling parameter;
    performing an updated vibrational analysis of the updated finite element model;
    predicting an updated drill string behavior based on the updated vibrational analysis; and
    determining whether the updated drill string behavior represents an improvement over the drill string behavior.

5. The method of claim 1, further comprising:
    detecting a change in the drill string property or the drilling parameter; and
    repeating steps (c)-(e) in response to detecting the change in the drill string property or the drilling parameter.

6. The method of claim 1, wherein the predetermined length is at least five feet.

7. A computer system comprising:
    a processor;
    a memory in communication with the processor; and
    instructions stored on the memory, the instructions, when executed by the processor, causing the processor to:
        (a) determine a drill string property for a drill string having a rotary steerable drill bit;
        (b) determine a drilling parameter for a drilling operation;
        (c) generate a finite element model of the drill string based on the drill string property and the drilling parameter, the finite element model comprising:
            a three-dimensional model;
            a plurality of nodes representing the drill string;
            a plurality of contact elements for each node of the plurality of nodes, the contact elements arranged in opposing pairs with a first pair situated orthogonally to a second pair;
        (d) perform a vibrational analysis of the finite element model;
        (e) predict a drill string behavior during the drilling operation based on the vibrational analysis, the drill string behavior comprising a directional behavior, a rate of penetration, or a drilling efficiency of the rotary steerable drill bit;
        detect, during the drilling operation, whether the rotary steerable drill bit has advanced in the drilling direction by at least a predetermined length that provides an interval to iterate at least some of steps (c)-(e); and repeat steps (c)-(e) in response to detecting that the rotary steerable drill bit has advanced by at least the predetermined length.

8. The system of claim 7, wherein performing the vibrational analysis comprises calculating an effect of an excitation factor based on the rotary steerable drill bit.

9. The system of claim 8, wherein
calculating the effect of the excitation factor comprises applying sinusoidal axial and lateral excitations of a lowest node of the plurality of nodes.

10. The system of claim 7, the instructions further causing the processor to:
determine an updated drilling parameter for the drilling operation;
generate an updated finite element model of the drill string based on the drill string property and the updated drilling parameter;
perform an updated vibrational analysis of the updated finite element model;
predict an updated drill string behavior based on the updated vibrational analysis; and
determine whether the updated drill string behavior represents an improvement over the drill string behavior.

11. The system of claim 7, the instructions further causing the processor to:
detect a change in the drill string property or the drilling parameter; and
repeat steps (c)-(e) in response to detecting the change in the drill string property or the drilling parameter.

12. The system of claim 7, wherein the predetermined length is at least five feet.

13. An article of manufacture comprising a non-transitory computer readable medium storing instructions that, when executed by a processor, cause the processor to:
(a) determine a drill string property for a drill string having a rotary steerable drill bit;
(b) determine a drilling parameter for a drilling operation;
(c) generate a finite element model of the drill string based on the drill string property and the drilling parameter, the finite element model comprising:
a three-dimensional model;
a plurality of nodes representing the drill string;
a plurality of contact elements for each node of the plurality of nodes, the contact elements arranged in opposing pairs with a first pair situated orthogonally to a second pair;

(d) perform a vibrational analysis of the finite element model;
(e) predict a drill string behavior during the drilling operation based on the vibrational analysis, the drill string behavior comprising a directional behavior, a rate of penetration, or a drilling efficiency of the rotary steerable drill bit;
detect, during the drilling operation, whether the rotary steerable drill bit has advanced in the drilling direction by at least a predetermined length that provides an interval to iterate at least some of steps (c)-(e); and
repeat steps (c)-(e) in response to detecting that the rotary steerable drill bit has advanced by at least the predetermined length.

14. The article of manufacture of claim 13, wherein performing the vibrational analysis comprises calculating an effect of an excitation factor based on the rotary steerable drill bit.

15. The article of manufacture of claim 14, wherein
calculating the effect of the excitation factor comprises applying sinusoidal axial and lateral excitations of a lowest node of the plurality of nodes.

16. The article of manufacture of claim 13, the instructions further causing the processor to:
determine an updated drilling parameter for the drilling operation;
generate an updated finite element model of the drill string based on the drill string property and the updated drilling parameter;
perform an updated vibrational analysis of the updated finite element model;
predict an updated drill string behavior based on the updated vibrational analysis; and
determine whether the updated drill string behavior represents an improvement over the drill string behavior.

17. The article of manufacture of claim 13, the instructions further causing the processor to:
detect a change in the drill string property or the drilling parameter; and
repeat steps (c)-(e) in response to detecting the change in the drill string property or the drilling parameter.

18. The article of manufacture of claim 13, wherein the predetermined length is at least five feet.

* * * * *